US009653910B2

(12) United States Patent
Drake et al.

(10) Patent No.: US 9,653,910 B2
(45) Date of Patent: May 16, 2017

(54) POWER STRUCTURE DIAGNOSTIC METHOD AND APPARATUS FOR IMPROVED MOTOR DRIVE DIAGNOSTIC COVERAGE

(71) Applicant: Rockwell Automation Technologies, Inc., Mayfield Heights, OH (US)

(72) Inventors: Reginald A. Drake, New Hamburg (CA); Angelo Bortolus, Mississauga (CA); Marius G. Chis, Cambridge (CA); John David Allan, Kitchener (CA); Zhongyuan Cheng, Cambridge (CA); Catalin Florin Gemanaru, Elmira (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 14 days.

(21) Appl. No.: 14/716,989

(22) Filed: May 20, 2015

(65) Prior Publication Data
US 2016/0141865 A1    May 19, 2016

Related U.S. Application Data

(60) Provisional application No. 62/079,599, filed on Nov. 14, 2014.

(51) Int. Cl.
 *H02P 3/06*  (2006.01)
 *H02H 7/08*  (2006.01)
 *H02P 29/024*  (2016.01)

(52) U.S. Cl.
 CPC ............. *H02H 7/0822* (2013.01); *H02P 3/06* (2013.01); *H02P 29/024* (2013.01)

(58) Field of Classification Search
 CPC ................. H02H 7/0822; H02P 3/06

USPC .................. 318/565, 434; 388/909
See application file for complete search history.

(56) References Cited

U.S. PATENT DOCUMENTS

| | | | | |
|---|---|---|---|---|
| 3,875,487 A | * | 4/1975 | White | H02H 7/0816 318/447 |
| 5,363,039 A | * | 11/1994 | Kumar | H02M 7/521 324/764.01 |
| 6,291,987 B1 | * | 9/2001 | Dean | H02M 7/521 324/164 |

OTHER PUBLICATIONS

"Safety in Control Systems According to EN ISO 13849-1 Machine Safety—Jokab Safety Products", ABB AB, 2TLC172003B02002 ABB Jokab Safety, 2011, 20 pages.
EN ISO 13849, Safety Performance Levels, Transition from EN954-1 to EN ISO 13849-1, Allen-Bradley, Guardmaster, Rockwell Automation, Publication: SAFETY-RM004A-EN-P, Apr. 2009, 25 pgs.

\* cited by examiner

*Primary Examiner* — Bentsu Ro
(74) *Attorney, Agent, or Firm* — Fay Sharpe LLP

(57) ABSTRACT

Motor drive diagnostic and control methods and apparatus are provided in which rectifier and inverter switching devices are individually monitored for malfunctions, and detected malfunctions initiate implementation of a safety function to signal a drive controller to shut down non-safety-related processing, to discontinue command pulse signaling to the switching devices, and to disable optical transmitters between the drive controller and the rectifier and inverter switches, and an input contactor or other switching circuit is opened to disconnect input power from the motor drive after implementation of the safety function.

19 Claims, 5 Drawing Sheets

POWER STRUCTURE DIAGNOSTIC METHOD AND APPARATUS FOR IMPROVED MOTOR DRIVE DIAGNOSTIC COVERAGE

REFERENCE TO RELATED APPLICATION

This application claims priority to and the benefit of U.S. Provisional Patent Application Ser. No. 62/079,599, filed Nov. 14, 2014, entitled POWER STRUCTURE DIAGNOSTIC METHOD AND APPARATUS FOR IMPROVED MOTOR DRIVE DIAGNOSTIC COVERAGE, the entirety of which is hereby incorporated by reference.

BACKGROUND INFORMATION

The subject matter disclosed herein relates to power conversion systems, and more specifically to techniques and apparatus for mitigating torque-causing conditions in a motor drive when a power structure device becomes inoperative.

BRIEF DESCRIPTION

One or more aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Power converter operating methods and apparatus are presented to detect degradation of individual power converter components for initiating system safe shutdown.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
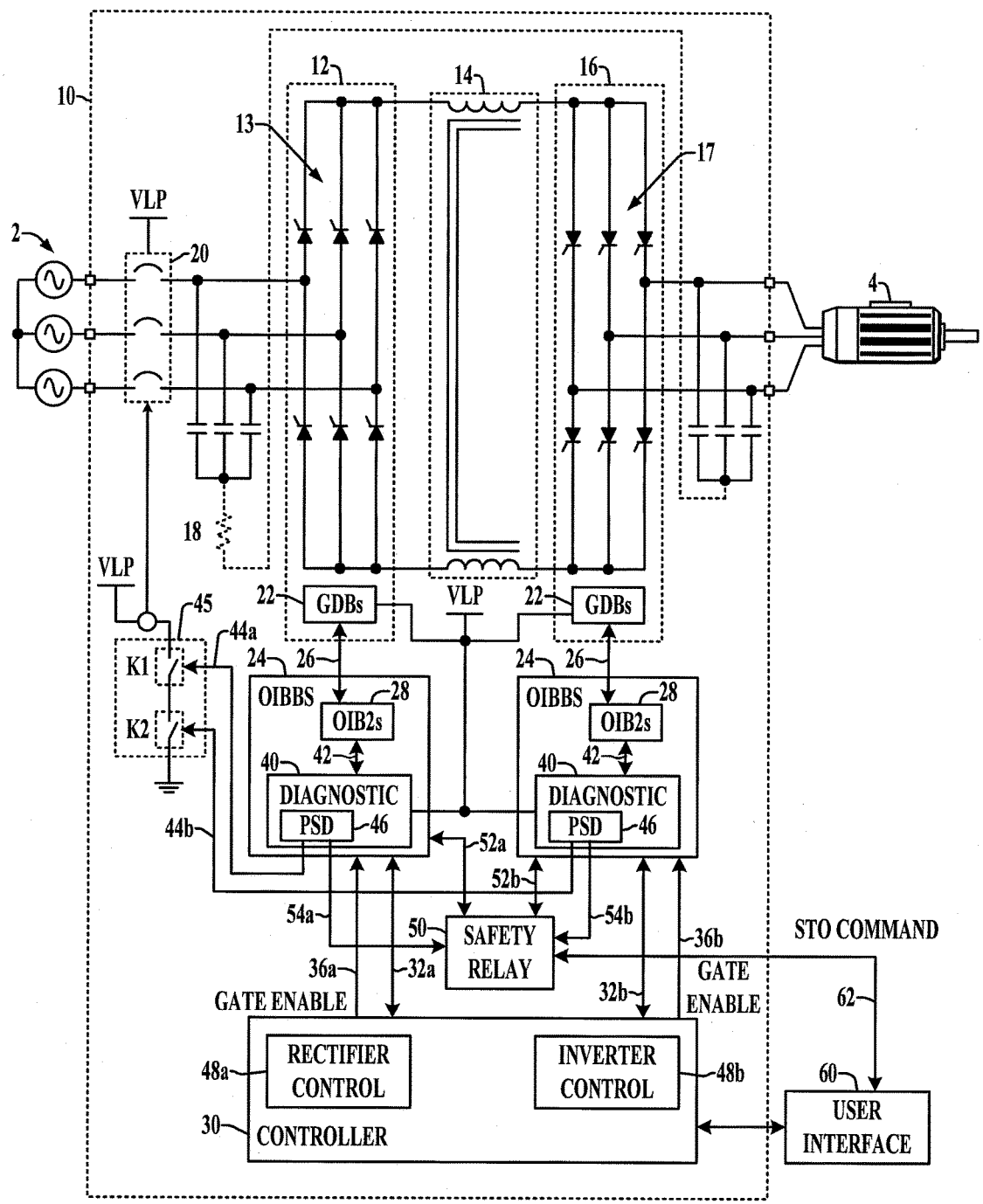
FIG. 1 is a system diagram.

FIG. 1 illustrates a motor drive system 10 receiving single or multiphase input power from a connected AC power source 2. The drive 10 provides variable frequency, variable amplitude AC output power to drive a single or multiphase AC motor or other load 4. Although illustrated as having a multiphase AC input and a multiphase AC output, other single or multiphase inputs and outputs can be provided in other embodiments. The illustrated motor drive includes a switching rectifier 12 with rectifier switching devices 13, as well as an intermediate DC circuit 14 and an output inverter 16 with inverter switching devices 17 coupled between the intermediate DC circuit 14 and the output load 4. The rectifier 12 is operable according to the switching control signals from a rectifier control component 48a of a drive controller 30 to convert AC input power to provide DC power to the intermediate DC circuit 14, and the inverter 16 operates according to inverter switching control signals from an inverter control component 48b of the drive controller 30 to convert DC power from the intermediate DC circuit 14 to provide AC output power to drive the load 4.

Figure 7:
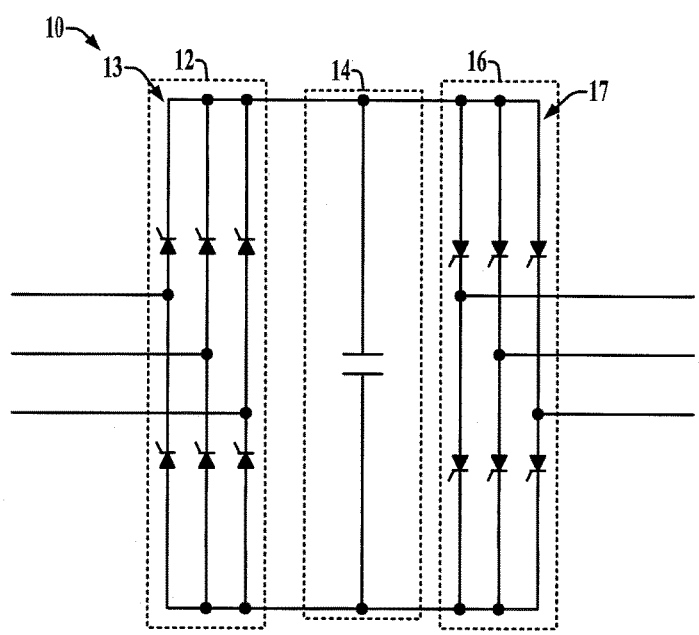
FIG. 7 is a partial system diagram.

The illustrated drive 10 is a current source converter (CSC) having an inductive intermediate DC circuit 14, for example, including a DC link choke having windings in a positive or upper DC circuit branch and another winding in the lower or negative DC circuit branch as illustrated in FIG. 1. In this case, the rectifier converter 12 provides a controlled DC link current as an input to the switching inverter 16. Other embodiments are possible (e.g., FIG. 7) in which the DC link circuit 14 includes one or more capacitors to implement a voltage source converter (VSC). The illustrated system 10 includes an active switching rectifier or active front end (AFE) 12, although a passive rectifier circuit can alternatively be used in other embodiments or the drive 10 may directly receive a DC input for use by the inverter 16.

The controller 30 in normal operation provides command pulse signals or values 70 for operating the rectifier and inverter switching devices 13 and 17 via optical interface circuitry 24, 28, which in turn provides switching control signals for individually operating the rectifier and inverter switching devices 13 and 17 based at least partially on the command pulse signals or values 70 from the controller 30. The controller 30 can be any suitable analog and/or digital hardware, processor executed software or firmware, programmable logic, etc. or combinations thereof which provides the command pulse signals in one example according to any suitable pulse width modulation (PWM) switching technique in order to operate the switching rectifier 12 to provide a controlled or regulated DC link current in the intermediate circuit 14, and to operate the switching inverter 16 so as to provide a controlled variable frequency, variable amplitude multiphase AC output to drive the motor load 4.

Figure 2:
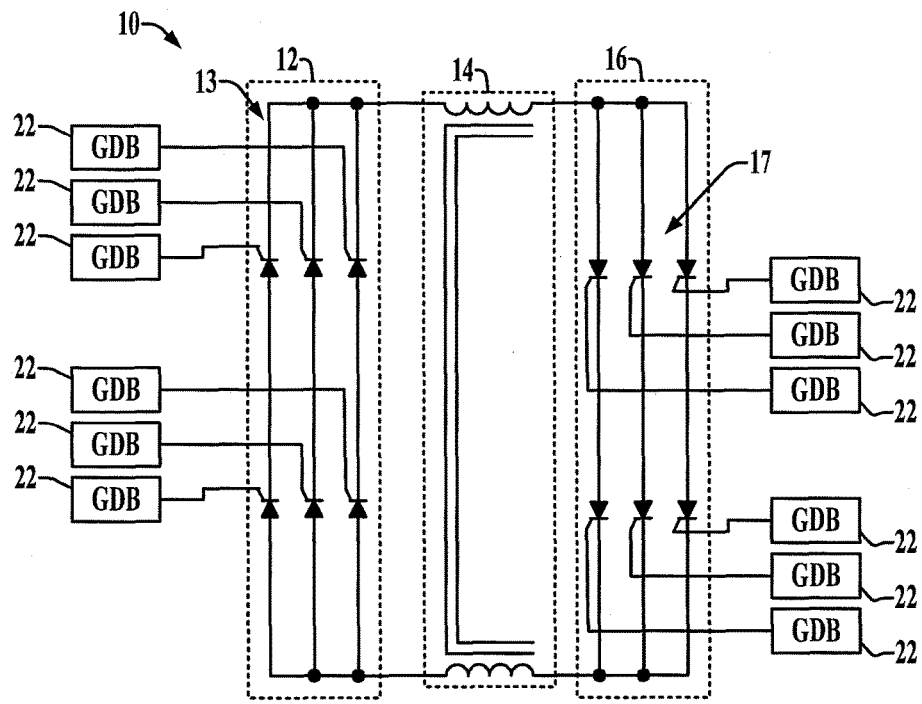
FIG. 2 is a partial system diagram.

As seen in FIG. 2, the switching devices 13 and 17 of the switching rectifier 12 and the switching inverter 16, respectively, are individually associated with a corresponding gate driver board (GDB) 22. In one embodiment, the switching devices 13 and 17 are SGCTs (symmetrical gate commutated thyristors) individually paired with a corresponding gate driver circuit 22, where the switching devices 13 and 17 may be high-power "puck" style devices mounted on a corresponding gate driver board 22 receiving signals from a corresponding optical interface board (herein "OIB2") 28. Other embodiments are possible using any suitable semiconductor switching devices 13, 17 including without limitation insulated gate bipolar transistors (IGBTs), integrated gate commutated thyristors (IGCTs), MOSFETs, etc. In the illustrated implementation, moreover, each optical interface board 28 provides signaling interfaces for command pulse signals or values 70 from the controller 30 to operate the corresponding switching device 13, 17 as well as optical interface circuitry for providing diagnostic signaling 72 from the corresponding gate driver board 22 back to the controller 30. In addition, the illustrated implementation includes optical interface boards 28 providing such optical interfacing for six gate driver boards and corresponding switching devices 13, 17, where a corresponding optical interface base board system (OIBBS) 24 provides interconnections for up to 18 sets of bidirectional signaling, with three board-board connectors (not shown) to accommodate three corresponding OIB2s 28, each providing connectivity to six of the switches 13, 17.

Figure 5:
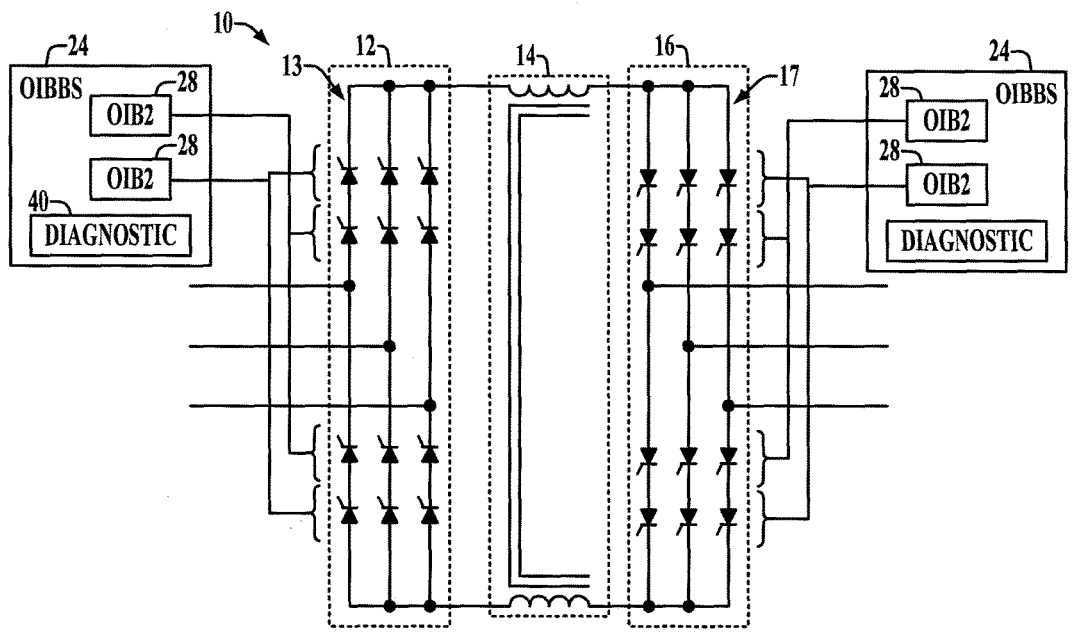
FIG. 5 is a partial system diagram.
Figure 6:
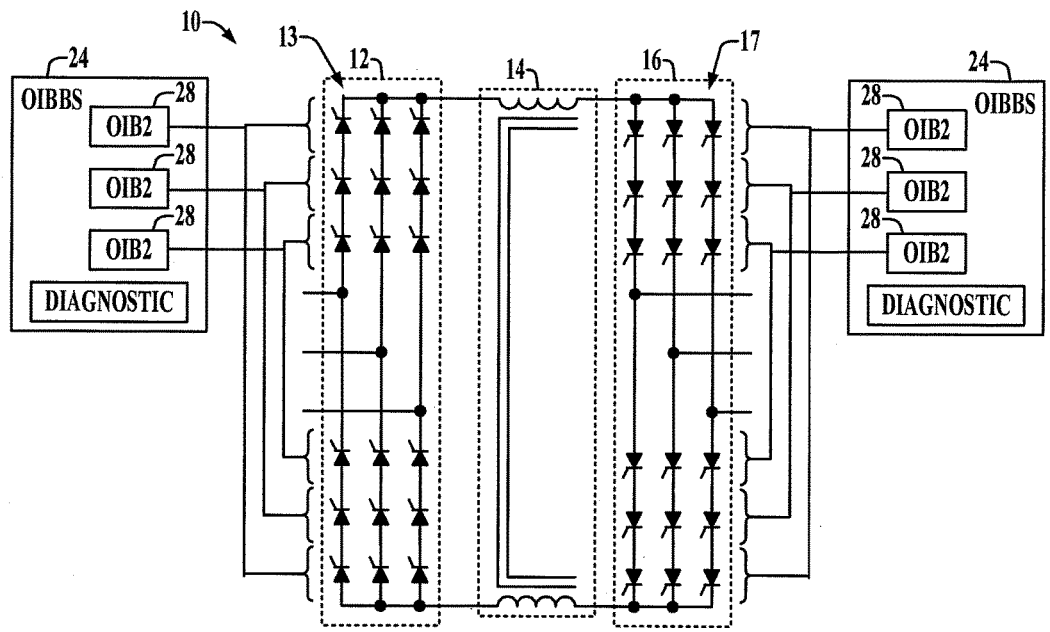
FIG. 6 is a partial system diagram.

As seen in FIGS. 5 and 6, various implementations of the rectifier 12 and/or the inverter 16 may include more than six switching devices 13, 17, with more switching devices being provided in each half-leg for higher voltage systems. In such cases, an OIB2 28 is provided for each set of six switches 13, 17, with each OIBBS 24 accommodating up to three OIB2s 28. In the illustrated embodiments, moreover, one OIBBS 24 is provided for interfacing the switching devices 13 of the rectifier 12, and a single OIBBS 24 interfaces the switching devices 17 of the switching inverter 16. As further seen in FIG. 3, moreover, each OIB2 26 provides an optical interface between the gate driver board 22 associated with a given individual switching device 13, 17, and includes optical transmitter and receiver circuits (not shown) providing an optical interface for electrical isolation between the gate driver board 22 and the OIBBS 24, as well as electrical isolation between the corresponding gate driver board 22 and the drive controller 30.

Returning to FIG. 1, the drive 10 may include input and output Y-connected capacitor banks, and the neutrals of the capacitor banks may be individually grounded and/or may be connected to one another directly or via a neutral resistance 18. In addition, an input contactor or other switching circuit 20 is provided for selectively connecting the AC input source 2 with the switching rectifier 12, or disconnecting the drive from the input power according to whether or not power is applied to a corresponding contactor coil from a low power voltage supply line VLP. An input control contactor or other input control circuit 45 is provided with two contacts or switches K1 and K2 coupled between the input contactor coil and ground such that both contacts K1 and K2 must be closed in order to close the input contactor 20. Any suitable switching's and control circuitry may be provided for selectively opening and closing the input contactor 24 selective removal of power from the rectifier 12 and the inverter 16 according to one or more control signals 44.

A diagnostic circuit 40 is provided in one embodiment as part of each OIBBS 24, to detect 104 an individual device malfunction associated with switching devices 13 and 17. Other embodiments are possible in which the diagnostic circuitry 40 is separate from the OIBBSs 24. The diagnostic circuit 40, moreover, can be implemented using one or more processor elements with corresponding executable software and/or firmware instructions, or in programmable logic, or in discrete analog and/or digital circuits, and/or combinations thereof in various embodiments. In addition, the diagnostic circuitry 40 can include suitable signal conditioning and other interface circuitry to accommodate analog and/or digital input and/or output signaling or messaging to implement the functions detailed herein.

The diagnostic circuit 40 in each of the OIBBSs 24 in this example includes a power structure diagnostic (PSD) component or circuit 46 where the PSD circuit 46 of the first OIBBS associated with the switching rectifier 12 provides a first signal 44a to operate the first contactor K1 of the input control relay 45, and the PSD 46 of the OIBBS 24 associated with the switching inverter 16 provides a control signal 44b to operate the second input control contactor switch or contact K2. The diagnostic circuit 40 and the associated OIB2(s) 28 of a given OIBBS 24 communicate via bidirectional communications lines 42, which can be analog signaling and/or digital value data lines or combinations thereof, and the individual OIB2s 28 implement bidirectional signal exchange via signal lines 26 with the corresponding gate driver boards 22 as shown in FIG. 1, whether direct communications or communications via the corresponding OIBBS 24. The input control relay 45 in another non-limiting example includes a single coil and one or more contacts with the OIBBs 24 providing signals 44a and 44b configured in series and logically ORed to disconnect the input contactor 20 and logically ANDed to enable the input contactor 20.

In addition, the system includes a safety relay 50 receiving power structure diagnostic (PSD) signals 54a and 54b from the PSD circuits 46. The safety relay 50 also implements bidirectional communications or signaling by suitable interconnections 52a and 52b with the OIBBSs 24 and communicates with a user interface 60 via a bidirectional communications or signaling link 62. Moreover, the drive controller 30 and the rectifier and inverter control components 48 thereof implement bidirectional communications or signaling with the OIBBSs 24 via communications or signaling links 32a and 32b, and the controller 30 provides an active low gate enable signal or value 36a, 36b to the corresponding OIBBSs 24.

Figure 3:
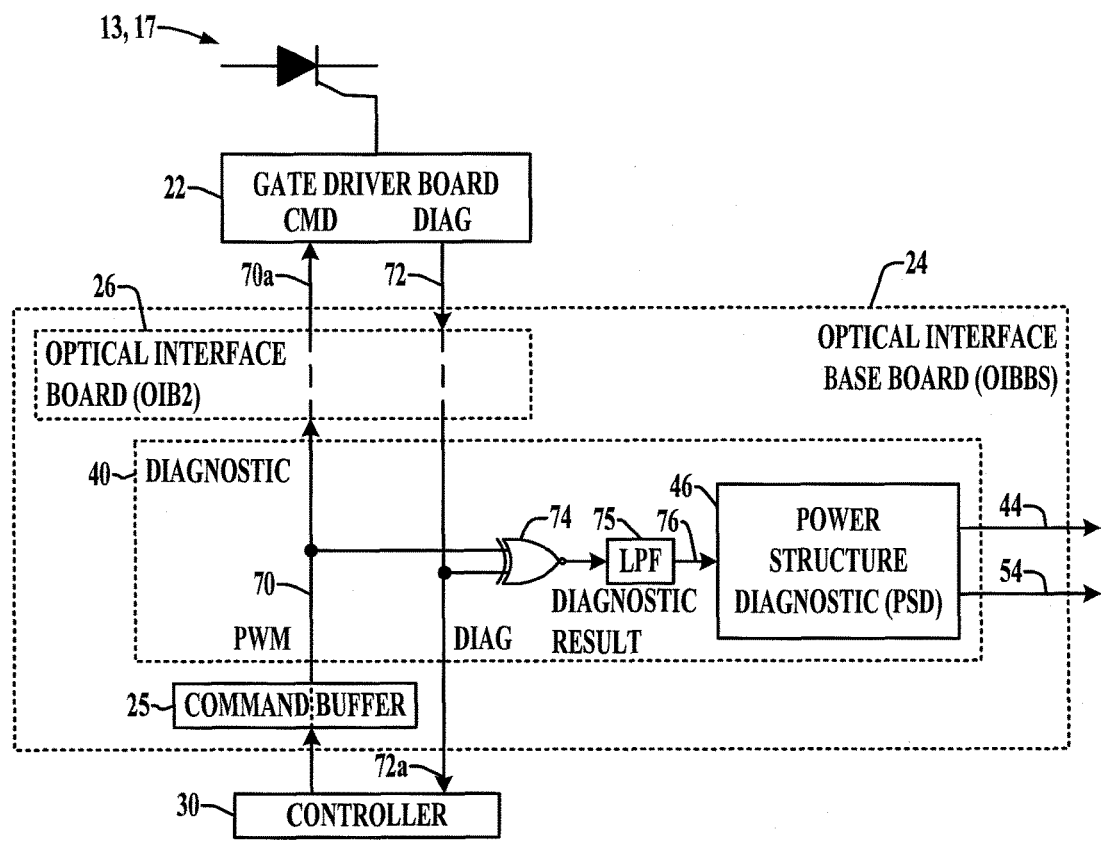
FIG. 3 is a partial system diagram.

Referring also to FIG. 3, in operation, the diagnostic circuit 40 in each of the OIBBSs detects individual power structure device malfunctions based on the signaling 70, 72 between the gate driver board 22 and the controller 30, and selectively implements or initiates a safety function in response to detection of the individual device malfunction. In addition, the diagnostic circuit 40 disconnects input power from the motor drive 10 by actuating the input contactor 20 via the input control relay 45 following implementation of the safety function in response to detection of the individual device malfunction. In this regard, the illustrated diagnostic circuit 40 selectively provides the power structure diagnostic PSD signal 44 to the input control circuit 45 to disconnect the input power from the motor drive 10 after implementation of the safety function in response to detection of an individual SGCT device malfunction.

As seen in FIG. 3, the controller 30 provides pulse width modulated command signals or values to a first in, first out (FIFO) command buffer 25 of the OIBBS 24, where a single buffer 25 is used in certain embodiments for buffering controller command signals and/or values for up to 18 different switches associated with the OIBBS 24. The pulse width modulated command signals or values 70 are provided from the command buffer through the optical interface board 26 to provide gate driver board command input signals and/or values 70a to the gate driver boards 22. The corresponding gate driver board 22 provides corresponding switching control signals to the control terminal of the corresponding switch 13, 17 in order to selectively operate the switching device 13, 17 according to the commanded PWM control.

In addition, the gate driver board 22 provides a diagnostic signal 72 through the optical interface board 26 in order to provide a feedback or diagnostic signal 72a to the drive controller 30. As further shown in FIG. 3, moreover, the diagnostic circuit 40 of the OIBBS 24 includes an exclusive NOR (XNOR) gate or function 74 for each of the 6, 12 or 18 associated switching devices 13, 17, where the gate or function 74 receives the corresponding signals 70 and 72a as inputs and provides an output to a low pass filter circuit or function 75. In one possible embodiment, the circuitry 74, 75 checks the anti-valence of the signals 70 and 72a, and the low pass filter feature 75 filters all time delay glitches, with the filter 75 providing an individual component malfunction signal or value 76 having a first state indicating an individual malfunction of the corresponding switching device 13, 17 as representing in coherency between the command signal 70 and the diagnostic feedback signal 72a.

Although illustrated and described as providing individual switching device malfunction detection capabilities, the diagnostic circuitry 40 and the concepts of the present disclosure can be used to detect an individual device malfunction associated with any individual potentially torque-producing component in the motor drive 10. In this regard, the inventors have appreciated that various device malfunction conditions for both CSC and/or VSC motor drive type power conversion systems 10 can potentially create output currents causing and/or modifying a torque of the motor load 4. Thus, for example, a short circuit malfunction (shorted and/or at least partially conductive anode and cathode path) of an SGCT or other rectifier or inverter switching device 13, 17, alone or in combination with one or more other individual device malfunctions in the drive 10, can lead to inadvertent connection of the AC input supply 2 with the motor load 4, despite the PWM control strategy for either or both of the switching rectifier and/or the switching inverter 16. Freewheeling diode components and/or other components malfunctioning in the rectifier 12 and/or the inverter 16 can also lead to undesirable currents flowing to the motor load 4. The systems of the present disclosure provide for individual detection of such malfunctions for selective implementation of a safety procedure and for turning off the input contactor 20 in response. The diagnostic systems of the present disclosure advantageously identify such individual power structure device (PSD) malfunctions via the diagnostic circuit 40 operation as detailed herein.

Figure 4:
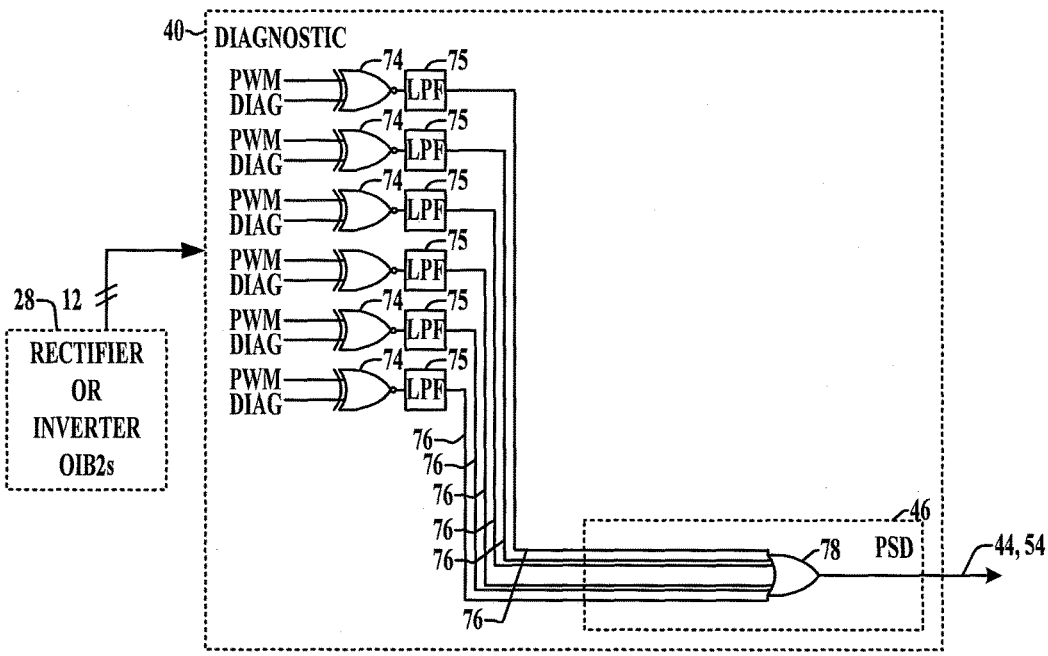
FIG. 4 is a partial system diagram.

As further shown in FIG. 4, the individual component malfunction signals or values 76 are logically OR'd together to provide the first and second power structure diagnostic signals 54 and 44, with the PSD circuit 46 in one embodiment including an OR gate 78 implemented in hardware and/or processor-executed software or firmware to provide the signals 44 and 54. In certain implementations, moreover, the diagnostic circuit 40 selectively delays provision of the signal 44 until a timer expires, while providing the signal 54 to signal the safety relay 50 without delay in response to detection of a potentially torque-causing component malfunction. As discussed above in connection with FIG. 1, moreover, the diagnostic circuit 40 provides the first power structure diagnostic signal 54 to the safety relay 50, and also provides the second power structure diagnostic signal 44 to the corresponding contact K1, K2 of the input control relay 45 after expiration of a timer started upon malfunction detection.

The safety relay 50 in FIG. 1 is operative to initiate a safety function in response to receipt of the power structure diagnostic signal 54a and/or 54b from the diagnostic circuits 40 of the OIBBSs 24. In addition, the safety relay 50 can initiate the safety function in response to receipt of a safe torque off (STO) command from the user interface 60 via the bidirectional communications link 62 in FIG. 1. In the illustrated embodiment, moreover, the safety relay 50 initiates the safety function by providing signaling and/or messaging to the OIBBSs 24, although not a strict requirement of all implementations. The diagnostic circuit 40 selectively disconnects the input power from the motor drive 10 via the contactor 20 after implementation of the safety function in response to detection of the individual device malfunction, and refrains from disconnecting the input power after the safety function is initiated by the safe mode command input from the user interface 60. The diagnostic circuit 40, moreover, operates to selectively detect individual device malfunctions in the drive 10, and to signal the safety relay 50 to initiate the safety function, and the diagnostic circuit 40 further operates to open the input contactor 20 via the signaling 44 in the illustrated embodiment.

Figure 8:
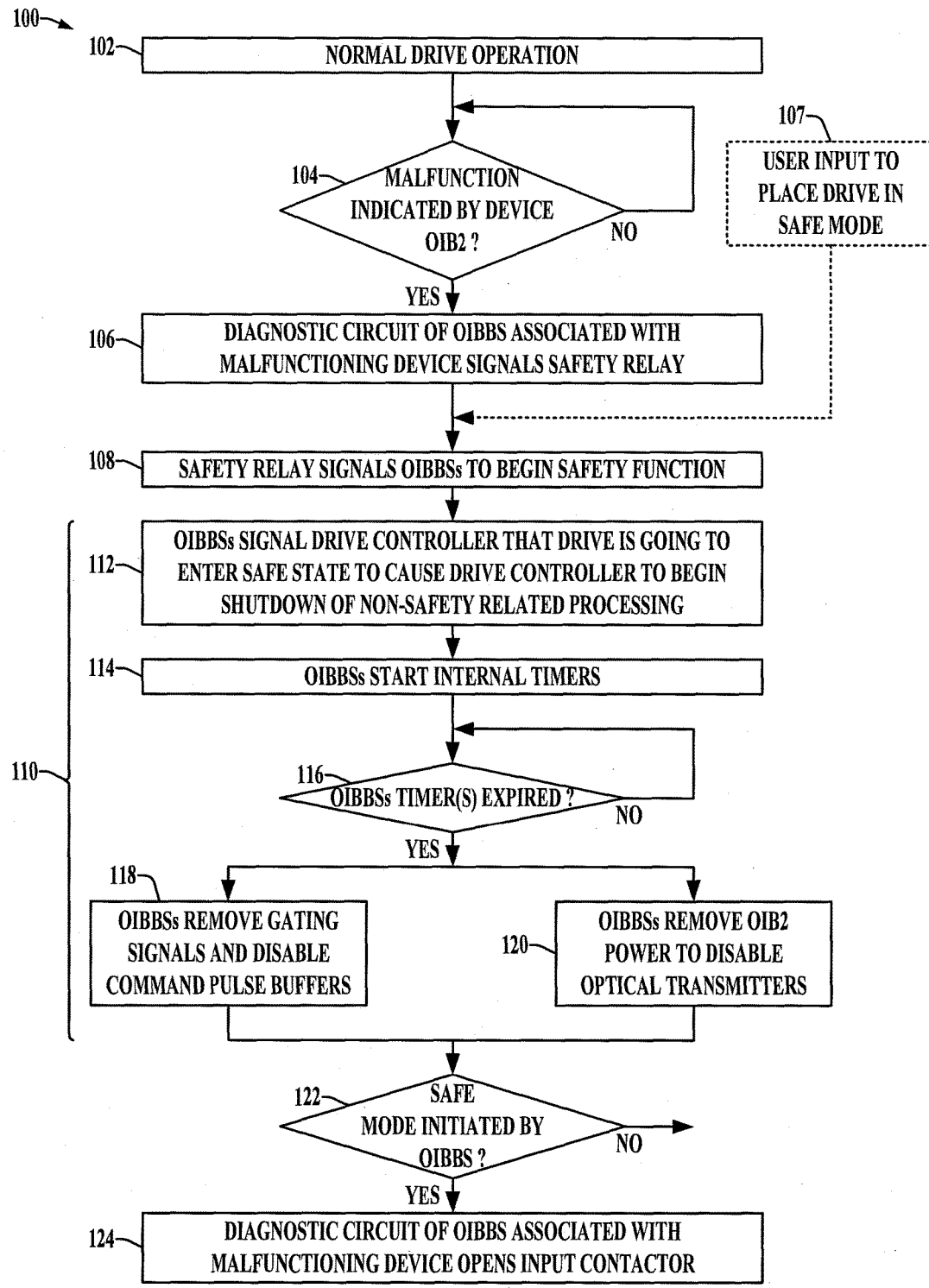
FIG. 8 is a flow diagram.

Referring also to FIG. 8, a process 100 is illustrated for mitigating torque-producing currents during or in response to component malfunctioning a motor drive or other power conversion system, such as the illustrated motor drive 10 above. Although the method 100 is illustrated and described as a series of acts or events, the methods of the present disclosure are not limited by the illustrated ordering of such acts or events except as specifically set forth herein. Except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software or processor-executed firmware, programmable logic, etc. or combinations thereof, and various embodiments or implementations include non-transitory computer readable mediums having computer-executable instructions for performing the illustrated and described methods. For example, the method 100 may be implemented by using the diagnostic circuit 40 and the safety relay 50 as described herein using program instructions with various instructions and data being stored in an electronic memory, although the method 100 can be implemented in other systems, including without limitation those illustrated and described herein.

At 102 in FIG. 8, normal motor drive operation occurs, and the diagnostic circuit 40 continually checks for any individual device malfunctions indicated by a device OIB2 at 104. If the diagnostic circuit 40 detects an individual device malfunction associated with one or more of the potentially torque-producing components (YES at 104), the diagnostic circuit 40 initiates a signal 54 to the safety relay 50 at 106. As further seen in FIG. 8, a user input may be provided to the user interface 60 at 107 in order to place the drive in a safe mode. At 108, the safety relay 50 signals both OIBBSs 24 to begin implementation of the safety function at 110 in FIG. 8, whether initiated by a device malfunction signal from an OIBBS 24 or based on a signal or message from the user interface 60. In addition, the OIBBS 24 associated with the malfunctioning device 13, 17 also issues a signal to the controller 30 at 112 to shutdown non-safety-related processing, thereby indicating that the drive 10 is going to be placed into a safe state. This warning or signaling at 112 allows the drive controller 30 to perform an internal shutdown, save process variables, etc.

At 114, the diagnostic circuitry 40 of the OIBBSs 24 set internal timers, for example, a 150 mS timer in one non-limiting embodiment. At 116, the diagnostic circuitry 40 waits for expiration of the OIBBS timers. Once the timers expire (YES at 116), the OIBBSs 24 remove the gating signals and disable the command pulse buffers at 118 (e.g., command buffer 25 in FIG. 3). The diagnostic circuitry 40 of the OIBBSs 24 remove power from the OIB2s 28 at 120 in order to disable the corresponding optical transmitters. A determination is made at 122 as to whether the safe mode was initiated by the OIBBS 24, and if not (NO at 122), the input contactor 20 (FIG. 1) remains closed. If, however, the safe mode operation was initiated by the OIBBS (YES at 122), the diagnostic circuit 44 of the OIBBS 24 associated with the malfunctioning component 13, 17 opens the input contactor 20 by providing the corresponding signal 44 to the input control relay 45.

This operation of the diagnostic circuitry 40 in the motor drive 10 advantageously provides safe operation with the ability to facilitate zero torque producing currents to the motor within a short period of time, such as within one second of detection of an individual power structure device malfunction. Accordingly, the drive 10 may be conformant with category 3 PL=e according to EN ISO 13849-1 and SIL3 according to EN 61508, EN 62061 and EN 61800-5-2. The system provides power structure diagnostics to open the input contactor 20 in response to a power circuit malfunction (e.g., an SGCT 13 and/or 17) with SIL3 reliability.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for mitigating torque-producing currents during component malfunctioning in a motor drive having a plurality of potentially torque-producing components, the method comprising:
    detecting an individual device malfunction associated with at least one individual potentially torque-producing component in the motor drive;
    implementing a safety function in response to detection of the individual device malfunction, the safety function comprising:
        signaling a drive controller to shut down non-safety-related processing by the drive controller,
        discontinuing command pulse signaling to the plurality of potentially torque-producing components of the motor drive, and
        disabling optical transmitters between the drive controller and the plurality of potentially torque-producing components; and
    disconnecting input power from the motor drive after implementation of the safety function in response to detection of the individual device malfunction.

2. The method of claim 1, wherein detecting the at least one individual device malfunction comprises:
    for each given potentially torque-producing component, comparing a command pulse signal for the given potentially torque-producing component from the drive controller with a device diagnostic signal from a driver circuit associated with the given potentially torque-producing component to provide an individual component malfunction signal or value associated with the given potentially torque-producing component; and
    providing a first power structure diagnostic signal to a safety relay of the motor drive to initiate the safety function if at least one of individual component malfunction signals or values individually associated with the plurality of potentially torque-producing components indicates a detected malfunction.

3. The method of claim 1, wherein discontinuing command pulse signaling to the plurality of potentially torque-producing components of the motor drive comprises disabling a command buffer that receives command pulse signals or values from the drive controller.

4. The method of claim 1, wherein implementing the safety function comprises:
    starting at least one timer in response to detection of the individual device malfunction; and
    disabling the optical transmitters between the drive controller and the plurality of potentially torque-producing components after the at least one timer expires.

5. The method of claim 1, wherein disconnecting the input power from the motor drive comprises opening an input switching circuit.

6. A system for mitigating torque-producing currents during component malfunctioning in a motor drive having a plurality of potentially torque-producing components, the system comprising:
    optical interface circuitry operatively coupled with a drive controller and with the plurality of potentially torque-producing components to selectively provide switching control signals for individually operating the plurality of potentially torque-producing components based at least partially on command pulse signals or values from the drive controller; and
    a diagnostic circuit operative to detect an individual device malfunction associated with at least one individual potentially torque-producing component in the motor drive, to implement a safety function in response to detection of the individual device malfunction, and to disconnect input power from the motor drive after implementation of the safety function in response to detection of the individual device malfunction, the safety function including signaling a drive controller to shut down non-safety-related processing by the drive controller, discontinuing provision of command pulse signals or values to the plurality of potentially torque-producing components of the motor drive, and disabling optical transmitters between the drive controller and the plurality of potentially torque-producing components.

7. The system of claim 6, wherein the optical interface circuitry comprises a command buffer operative to receive command pulse signals or values from the drive controller, and wherein the diagnostic circuit is operative to discontinue providing command pulse signals or values to the plurality of potentially torque-producing components of the motor drive by disabling the command buffer.

8. The system of claim 6, wherein the diagnostic circuit is operative to implement the safety function by starting at least one timer in response to detection of the individual device malfunction, and wherein the diagnostic circuit is operative to disable the optical transmitters between the drive controller and the plurality of potentially torque-producing components after the at least one timer expires.

9. The system of claim 8, wherein the diagnostic circuit is operative to detect an individual device malfunction by:
for each given potentially torque-producing component, comparing a command pulse signal for the given potentially torque-producing component from the drive controller with a device diagnostic signal from a driver circuit associated with the given potentially torque-producing component to provide an individual component malfunction signal or value associated with the given potentially torque-producing component; and
providing a first power structure diagnostic signal to a safety relay of the motor drive to initiate the safety function if at least one of individual component malfunction signals or values individually associated with the plurality of potentially torque-producing components indicates a detected malfunction.

10. The system of claim 6, wherein the diagnostic circuit is operative to detect an individual device malfunction by:
for each given potentially torque-producing component, comparing a command pulse signal for the given potentially torque-producing component from the drive controller with a device diagnostic signal from a driver circuit associated with the given potentially torque-producing component to provide an individual component malfunction signal or value associated with the given potentially torque-producing component; and
providing a first power structure diagnostic signal to a safety relay of the motor drive to initiate the safety function if at least one of individual component malfunction signals or values individually associated with the plurality of potentially torque-producing components indicates a detected malfunction.

11. The system of claim 6, wherein the diagnostic circuit is operative to disconnect input power from the motor drive after implementation of the safety function by opening an input switching circuit of the motor drive in response to detection of the individual device malfunction.

12. A motor drive, comprising:
a switching rectifier comprising a plurality of rectifier switching devices selectively operable according to a corresponding plurality of rectifier switching control signals to convert AC input power to provide DC power to an intermediate DC circuit;
a switching inverter comprising a plurality of inverter switching devices selectively operable according to a corresponding plurality of inverter switching control signals to convert DC power from the intermediate DC circuit to provide AC output power to drive a load;
a controller operative to provide command pulse signals or values for operating the rectifier and inverter switching devices;
optical interface circuitry operative to selectively provide switching control signals for individually operating the rectifier and inverter switching devices based at least partially on the command pulse signals or values from the controller; and
a diagnostic circuit operative to detect an individual device malfunction associated with at least one of the rectifier and inverter switching devices, to implement a safety function in response to detection of the individual device malfunction, and to disconnect input power from the motor drive after implementation of the safety function in response to detection of the individual device malfunction.

13. The motor drive of claim 12, comprising:
a switching circuit coupled between the switching rectifier and an AC power source; and
an input control circuit operatively coupled with the diagnostic circuit, the input control circuit operable according to a power structure diagnostic signal to selectively place the switching circuit in an open condition to disconnect the switching rectifier from the AC power source;
wherein the diagnostic circuit is operative to selectively provide the power structure diagnostic signal to the input control circuit to disconnect the input power from the motor drive after implementation of the safety function in response to detection of the individual device malfunction.

14. The motor drive of claim 12, comprising a user interface, wherein the diagnostic circuit is operative to implement the safety function in response to detection of the individual device malfunction, or in response to a safe mode command input from the user interface.

15. The motor drive of claim 14, wherein the diagnostic circuit is selectively operative to disconnect the input power from the motor drive after implementation of the safety function in response to detection of the individual device malfunction, and to refrain from disconnecting the input power from the motor drive after implementation of the safety function in response to receiving the safe mode command input from the user interface.

16. The motor drive of claim 14, wherein the diagnostic circuit is operative to implement the safety function by signaling a drive controller to shut down non-safety-related processing by the drive controller, discontinuing provision of command pulse signals or values to the rectifier and inverter switching devices, and disabling optical transmitters between the drive controller and the rectifier and inverter switching devices.

17. The motor drive of claim 12, wherein the diagnostic circuit is operative to implement the safety function by signaling a drive controller to shut down non-safety-related processing by the drive controller, discontinuing provision of command pulse signals or values to the rectifier and inverter switching devices, and disabling optical transmitters between the drive controller and the rectifier and inverter switching devices.

18. The motor drive of claim 17, wherein the diagnostic circuit is operative to implement the safety function by starting at least one timer in response to detection of the individual device malfunction, and wherein the diagnostic circuit is operative to disable optical transmitters between the drive controller and the rectifier and inverter switching devices after the at least one timer expires.

19. The motor drive of claim 12, wherein the diagnostic circuit is operative to detect an individual device malfunction by:
for each given rectifier and inverter switching device, comparing a command pulse signal for the given potentially torque-producing component from the drive controller with a device diagnostic signal from a driver circuit associated with the given switching device to provide an individual component malfunction signal or value associated with the given switching device; and
providing a first power structure diagnostic signal to a safety relay of the motor drive to initiate the safety function if at least one of individual component malfunction signals or values individually associated with the rectifier and inverter switching devices indicates a detected malfunction.

* * * * *